April 7, 1953 W. MATTSON 2,633,880
HEAVY DUTY TREE CUTTER
Filed June 22, 1951 2 SHEETS—SHEET 2

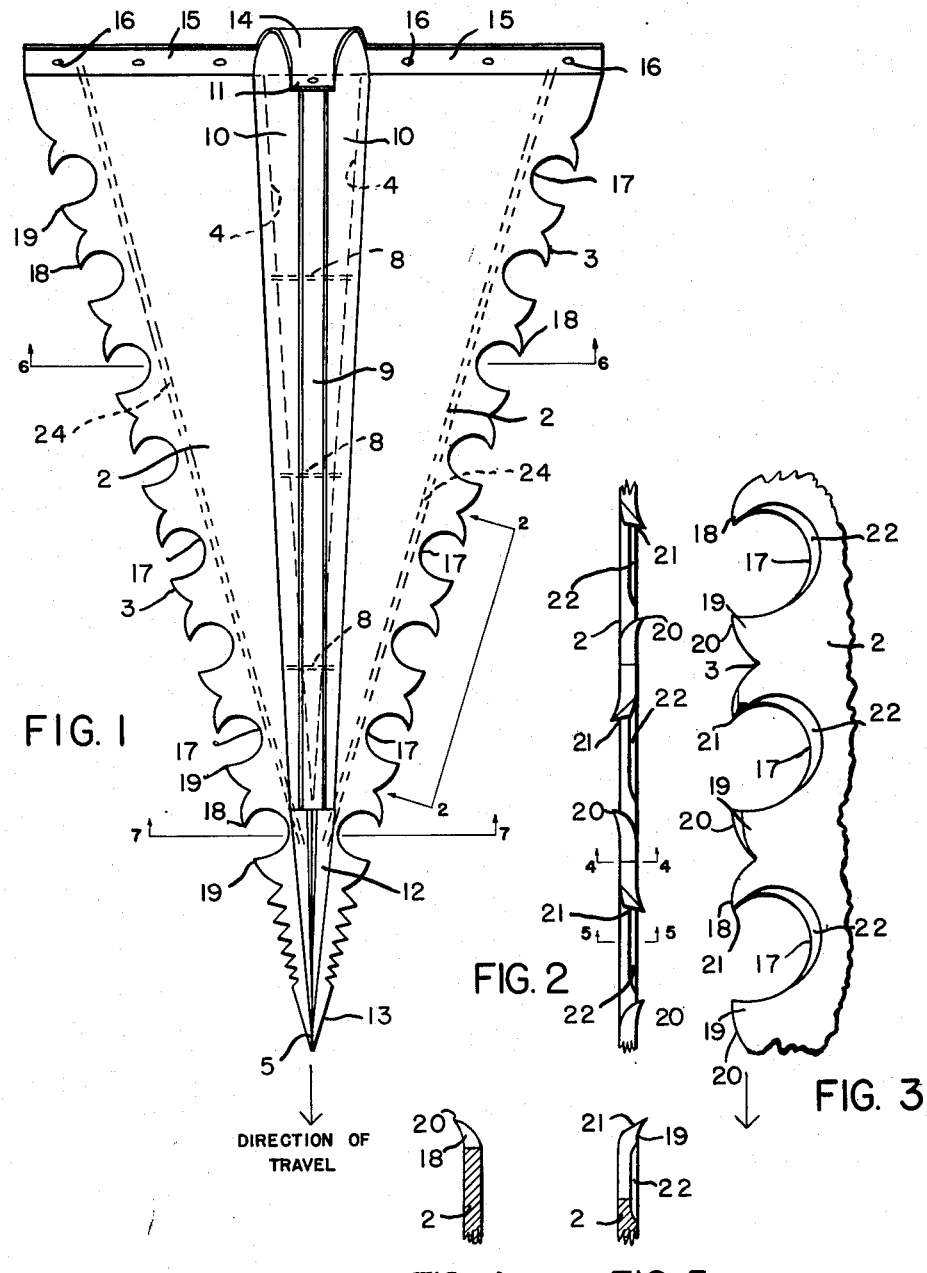

*INVENTOR.*
WILLIAM MATTSON
BY
Richard P. Cardew
AGENT

Patented Apr. 7, 1953

2,633,880

UNITED STATES PATENT OFFICE 2,633,880

HEAVY DUTY TREE CUTTER

William Mattson, Floodwood, Minn.

Application June 22, 1951, Serial No. 232,900

5 Claims. (Cl. 144—34)

This invention relates to means for cutting down trees and has special reference to a heavy duty device which will fell trees of relatively large diameter in a minimum of time. The invention has particular utility in the clearing of land.

It has long been a problem to cut trees off cleanly and close to the ground; usually a stump is left which sticks several inches, and sometimes well over a foot, above ground level. For some purposes, it is undesirable to have these stumps sticking up, yet it would be expensive and impractical to blast or pull the stumps out of the ground. One such circumstance is when land is being cleared in an area where a water reservoir is to be made to hold the water backed up by a dam across a river or the like. The trees must all be removed from the land to insure against their being washed into or against the gates of the dam, and the stumps must be kept at an absolute minimum height to permit the use of the reservoir by boats, fishermen, and the like, without the hazard of projections which may damage the boat or snag fishing equipment.

These land clearing jobs have usually been rather costly undertakings because the specifications for the job usually include the cutting of the trees within a relatively short distance from the ground.

The common procedure for cutting the trees is to use so-called chain-saw gangs who employ power saws having an endless chain-like cutting blade. The saw gangs usually include two or three men who notch the trees and handle the relatively heavy saw and motor by hand to cut through the trees. Bulldozers are usually used to move the trees out of the area to be cleared. This procedure requires many men who are paid relatively high wages, and it takes a considerable length of time to cut down the trees from a large area of land, resulting in a high cost for the project, of course.

It is, therefore, one of my principal objects to provide a faster means for cutting trees close to the ground.

Another object is to provide a tree cutting means which does not require the initial notching of the tree before it is cut to control the direction in which the tree will fall, thereby permitting closer cutting of the tree to the ground, and to permit trees to be felled in any desired direction irrespective of whether or not they lean slightly one way or the other, it being well known that the common method of cutting down trees includes notching a tree on the side toward which it leans, and then cutting from the opposite side of the tree above the notch inwardly toward the notch so the tree will fall due to its own overbalanced position.

Another object is to provide such a device which can be used with a minimum number of men and which requires no extra skill of the men employed to run the propelling means for the cutting device.

Another object is to provide a strong tree cutting blade which can be installed on the front of a bulldozer, tractor, or the like, with the least modification of the latter, and which may be operated effectively and efficiently by anyone who can operate a bulldozer.

Another object is to provide a two-sided blade whereby trees may be felled with least manipulation of the tractor or other propelling means, as the blade may be run through the tree from either side. In addition, if an unusually large tree is encountered which is thicker at its base than the width of the saw blade, a short pass may be made with the blade being run partially through the tree on one side, and then the propelling device, such as a tractor, may back off and engage the blade on the opposite side of the tree and cut it the rest of the way through with another full pass. Thus, a minimum of maneuvering is required to fell even the largest trees.

Another object is to provide a tree cutting device which is of relatively simple yet rigid and strong construction, whereby least maintenance is required thereon.

Another object is to provide a saw blade having a particular and special tooth construction and arrangement for maximum cutting efficiency.

A further object is to provide a means for pushing trees over when they have been cut down, so that they fall in a desired direction and do not damage the cutter, the tractor, or the operator.

These and other objects and advantages will become more apparent as the description of my invention proceeds.

In the accompanying drawing forming a part of this application:

Fig. 1 is a top plan view showing a tree cutting device made in accordance with my invention.

Fig. 2 is an edge view from the line 2—2, Fig. 1.

Fig. 3 is a plan view of Fig. 2.

Fig. 4 is a sectional view on the line 4—4, Fig. 2.

Fig. 5 is a sectional view on the line 5—5, Fig. 2.

The blade 1 of a bulldozer is readily adapted as a means for mounting my invention because it may readily be raised, lowered, or held in a desired position by the operator of the vehicle, and, for purposes of illustration, the invention shall be described as being applied to a bulldozer blade.

However, it is to be understood that the invention may be mounted by other means than that here shown and described without departing from the spirit of the invention.

Figure 7:
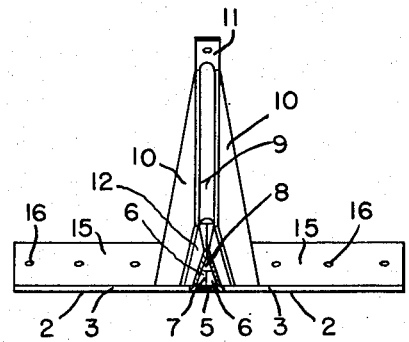
Fig. 7 is a sectional view on the line 7—7, Fig. 1.

The tree cutter comprises a pair of blades 2—2, each of which has a saw-tooth cutting edge 3 along one side thereof. The two blades lie in the same plane and at acute angles to each other, the angular relation preferably being from 30° to 45°. The blades have their cutting edges disposed outwardly, away from each other, and their cutting edges 3 converging to substantially a point at their forward ends, as shown, whereby a substantially triangular saw device is obtained. The blades of the saw device are preferably made of relatively thick high-carbon steel plate, each of the blades being made from a strip of plate of suitable width to cut through the larger trees one expects to encounter, and the inner edges 4 of the blades are cut adjacent their forward ends in an angular relation to the saw-tooth cutting edge whereby the inner edges of the blades will abut and may be welded together along the centerline of the angle formed by the cutting edges 3 of the blades, as at 5, Figs. 1 and 7. For normal work in land clearing where trees up to thirty inches in diameter may be encountered, I prefer to use about a three-fourths inch thickness and thirty inch width of plate for my blades 2—2, and I prefer that the saw device be approximately eleven or twelve feet long for most effective and efficient operation. However, it will be apparent that if the device is to be used for cutting only smaller trees, the width and thickness of plate may be reduced, and the blade length may be reduced somewhat as well, of course, but the angular disposition of the cutting edges of the blades should be maintained between 30° and 45° for best results.

As may be seen from the drawings, the rear end of the saw is quite wide, and a V-shaped opening occurs between the inner edges 4 of the blades which diverge toward the rear of the saw. This opening or space between the blades I employ for accommodating reenforcing means for the blades, as will be apparent.

Along the inner edges 4 of each of the blades 2, I have fixed, as by welding or the like, an upwardly disposed and slightly inwardly inclined flange 6 made preferably of the same material as the blades, the forward edges of the flanges being butted together and welded securely as at 7. Thereby there is provided a beam-effect which rigidifies the relative positions of the blades and prevents undue flexing and bending of the blade.

In addition, I have provided spaced struts 8 extending between the opposed flanges 6 to further strengthen the blades to withstand the stresses of being forced through a large tree trunk, the flanges 6 and struts 8 forming a triangular frame of a plurality of adjacent box-like segments, as shown.

To further reenforce the blades, I have mounted a central rib or beam 9 of heavy duty metal bar or rod material over the longitudinal center-line of the blades, the beam or rib being inclined upwardly from front to rear of the blades, as shown, and being held in position by means of substantially triangular side plates 10, the latter being welded securely in place between the flanges 6 and the beam whereby a strong and rigid housing is formed having angularly disposed sides which converge toward the front or forward end of the saw. The extreme outer tip or end 13 of the housing is preferably reenforced by a housing 12 made of metal plates only, as shown, and the beam 9 ends in rearwardly spaced relation to the tip 13 of the saw, as the beam would be too thick and would obstruct the cutting of the front end of the saw if it extended to the tip 13, as is deemed apparent.

As means for mounting the saw on a suitable vehicle, such as a tractor having a bulldozer blade 1 thereon, I prefer to fix a length of heavy mounting plate 14 across the rear end of the housing, the plate 14 being fixed to the rear edges of the beam 9, housing plates, and to the rear edges of the blades 2—2, thereby providing further reenforcement and rigidity for the blades. The portion 15 of the plate 14 preferably extends above the edges of the blades 2—2 and has openings 16 therethrough, or other suitable means, to permit the attachment of the plate to the lower portion of the bulldozer blade 1. A second portion 11 of the plate extends above the upper rear end of the housing and has openings, or other suitable means, to permit its being attached to the upper portion of the bulldozer blade, whereby the saw device is carried by and is movable with the blade 1 of the bulldozer.

If desired, the mounting plate 14 may be shaped to fit the contour of the blade as shown, or the plate may be flat. Suitably contoured ribs may be welded to the plate to fill the contour of the blade of the bulldozer and thereby insure a firm seat for the saw device on the blade, if desired.

Obviously, the saw device could be mounted on the bulldozer blade mountings without the blade being in place thereon, if desired, by providing suitable braces and attachments, not shown, whereby the device may be raised, lowered, or held in any desired position for operation.

The outer edges 3 of the blades 2—2 are provided with relatively large teeth, the teeth being in pairs, the pairs being spaced apart or separated by relatively wide and deep pockets 17. As will be seen in the drawings, each pair of teeth comprises a front or raker tooth 18 and a rear or cutter tooth 19, the teeth of each pair being oppositely disposed or set; that is, in the teeth of one pair the raker is set upwardly and the cutter downwardly, and in the following pair the raker is set downwardly and the cutter upwardly. It will thus be seen that the raker tooth of each pair serves to clear shavings or sawdust which are cut by the cutter tooth of the preceding pair of teeth.

The cutter teeth are contoured with a rearward and outward arc which is sharpened to an elongated cutting edge 20 extending substantially longitudinally of the blade, the cutting teeth being set so as to slice through the tree trunks to cut a slot slightly wider than the thickness of the blade. In addition, the cutter teeth are longer, or extend outwardly farther, than the raker teeth of each pair.

The raker teeth are shorter than the cutter teeth and have their forward or cutting edge 21 disposed in an angular relation transversely of the blade's thickness, the angular disposition of the cutting edge being such that the portion of the wood of the tree trunk which is cut or defined by the preceding cutter tooth may be progressively torn loose and directed into the pocket 17 as the blade moves into the tree trunk, whereby the shavings and cuttings are constantly moved and cleared away from the cutting surfaces, and the blade is free of compressive resistance which might be otherwise built up against the cutting action of the saw if the shavings and cuttings were not moved out of the way. The pockets, being relatively large, will receive the loosened cuttings and hold same as the blade travels through the tree trunk.

In order to facilitate the clearing of the wood cuttings from the pocket 17 when the latter emerge from the tree trunk, I have dished or beveled the under side of the walls of each pocket as at 22 whereby the shavings cannot be held in the pockets but fall readily therefrom to clear the saw for its next cut.

Figure 8:
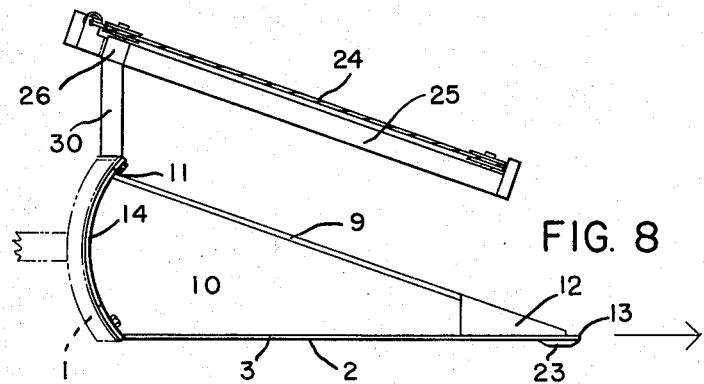
Fig. 8 is a side elevational view of my tree cutter and showing the means for pushing trees over as they are cut.
Figure 6:
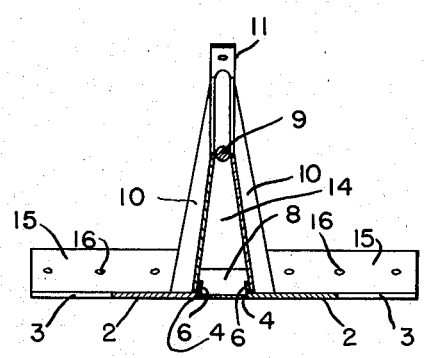
Fig. 6 is a sectional view on the line 6—6, Fig. 1.

In operation, with the device mounted as above described, the operator of the vehicle to which the saw is attached will move the saw to a position substantially parallel with the plane of travel of the vehicle and will hold same there. It may be desired to have a guide shoe 23 (Fig. 8) of a predetermined height mounted on the under side of the blade adjacent the forward end thereof to prevent the front end of the blade from sticking into the ground as it is pushed ahead of the vehicle, and to make it easier for the operator of the powering vehicle to put the blade in its desired cutting position.

Figure 9:
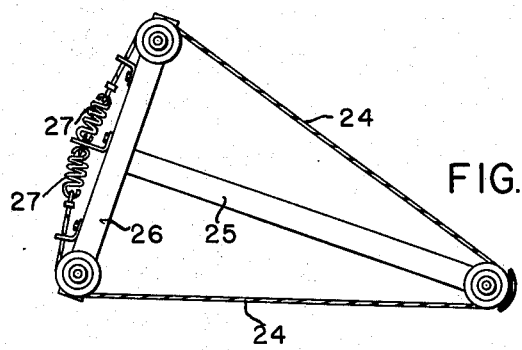
Fig. 9 is a top view of the tree pushing means shown in Fig. 8.

As the vehicle moves forward, it is driven substantially straight toward a tree to be cut in such a manner that the tree is engaged by the foremost teeth on one or the other of the blades 2; that is, the tip 13 of the saw is guided close to but to one side of the tree to be cut so that the teeth of the blade will engage the tree trunk and cut thereinto. Because the saw blades are disposed in a predetermined angular relation to each other, the substantially straight forward motion of the vehicle pushing the saw blade before it causes the saw to cut into the tree trunk at a progressively increasing depth and the cuttings or shavings are carried out of the cut and deposited on the other side of the tree. The cutting by the blade through the tree trunk is very fast, in fact, it is so fast that before the tree can begin to lean and fall in any uncontrollable direction, it will be engaged and pushed forwardly and away from the vehicle and saw by a cable 24 (Figs. 8 and 9) which is preferably mounted a considerable distance above the blades and in substantial vertical alinement with the inner limits of the cutting edges of each of the blades 2—2, as shown. The cable 24 is held in place between the outer end of the boom 25 which extends forwardly from a suitable mounting member 30 on the blade, and the outer ends of the cross arm 26 which is also carried on the mounting member 25, as shown. The cable is preferably provided with suitable tensioning means, such as the springs 27 shown, or by a gravity tensioning mechanism, not shown, to insure its being able to function properly without breaking.

The cable, of course, also protects the vehicle operator and the equipment from injury or damage from trees falling in uncontrolled directions.

One pass is all that is required to cut through trees which are as thick as the widest portion of the blades 2—2, and the vehicle can move on to the next tree to be cut. If thicker trees are encountered, a partial pass of one blade into one side of a tree and a complete pass of the other blade into the opposite side of the tree will sever the tree completely and allow same to be pushed over by the tree-pushing mechanism; thereby, a minimum of operations accomplishes the required work in a minimum of time.

Usually only one of the blades 2—2 is used for cutting through a tree, and it is deemed apparent that my invention could be used with only one blade mounted on a vehicle in acute angular relation to the direction of travel of the vehicle; however, I have here shown and described my invention with two blades, as this is the most practical form of my invention at the present time.

It is to be understood that I have herein shown and described one specific embodiment of my invention, and that my appended claims are not necessarily limited specifically thereto, but should be construed as broadly as permissible in view of the prior art.

Having thus described my invention, what I claim is:

1. A heavy duty tree cutter for use with a self-propelled vehicle having means for raising and lowering an object carried thereby comprising: a substantially horizontal elongated blade having a leading edge, a plurality of teeth formed in said leading edge, a first member having one substantially straight edge fixed to and extending longitudinally of said blade in spaced relation to said leading edge to rigidify said blade against flexing, a second member having one edge fixed to said blade and extending transversely of the rear end of said blade to rigidify same, and means for attaching said blade and first member to said raising and lowering means of said vehicle in at least three non-rectilinearly widely spaced positions so that said blade is carried forwardly of said vehicle and said leading edge will be disposed at an acute angular relation to the normal direction of travel of said vehicle whereby the forward movement of said vehicle will force said teeth progressively through the trunk of a tree when said tree is first engaged by the foremost portion of said blade.

2. A heavy duty tree cutting device for use with a self-propelled vehicle comprising: an elongated blade having a leading edge, means to attach said blade on said vehicle in at least three non-rectilinearly and widely spaced positions with said leading edge disposed at an acute angle to the direction of travel of said vehicle, a plurality of teeth formed in said leading edge, and means for rigidifying said blade comprising an elongated first member having a substantially straight edge rigidly fixed longitudinally of said blade in spaced relation to said leading edge, said member being disposed in an angular relation to the plane of said blade to reenforce same and prevent flexing of the latter, and a second reenforcing member fixed to said blade adjacent the rear edge thereof, said second member being disposed in angular relation to the plane of said blade and in angular relation to said first reenforcing member to prevent flexing of said blade in a direction substantially transversely of said blade.

3. A heavy duty tree cutter for use with a self-propelled vehicle comprising: a substantially horizontal elongated blade having a leading edge, means for attaching said blade to said vehicle so that said leading edge will be disposed in an acute angular relation to the normal direction of travel of said vehicle, a plurality of teeth formed in said leading edge, and a first elongated rigidifying member having a substantially straight edge fixed rigidly to said blade longitudinally thereof in spaced relation to said leading edge, said member being disposed substantially normal to the plane of said blade to rigidify said blade against flexing, said attaching means including a second member fixed transversely of said blade at the rear end thereof, said second member having spaced means to receive attaching elements, and a third member at the upper rear end of said first rigidifying member, said third member having means for receiving attaching elements.

4. A heavy duty tree cutting device for attachment to a self propelled vehicle comprising: a pair of substantially horizontal elongated blades each having a leading edge, means at the rear of said blades for attaching same on said vehicle in at least three non-rectilinearly widely spaced positions with said leading edges of said blades disposed in angular relation to each other and in opposed acute angular relation to the direction of travel of said vehicle, a plurality of teeth formed in said leading edges, and means for rigidifying said blades against flexing comprising a rigid member having one of its edges fixed to said blades in inwardly spaced relation to said leading edges and upstanding therefrom, said rigidifying member dividing said blades from each other substantially centrally between said leading edges and being disposed substantially in alinement with the direction of travel of said vehicle, and a second member having one edge fixed transversely of said blades at the rear end thereof and in angular relation to the plane of said blade to further rigidify said blade.

5. A tree cutting device for use with a self-propelled vehicle comprising: a pair of substantially horizontal elongated blades each having a leading edge, means for attaching said blades on said vehicle with each of said leading edges disposed in acute angular relation to each other and to the direction of travel of said vehicle, a plurality of teeth formed in said leading edges, and means fixed to and between said blades to rigidify and strengthen the association of said blades to each other comprising a housing of substantially inverted V-shape in cross-section fixed to and between said blades, said housing being of progressively greater width and height from the forward toward the rear end of said blades, and being located substantially centrally between said blades.

WILLIAM MATTSON.

REFERENCES CITED

The following references are of record in the file of this patent:

UNITED STATES PATENTS

| Number | Name | Date |
|---|---|---|
| 352,624 | Laughlin | Nov. 16, 1886 |
| 452,391 | Rothgery | May 19, 1891 |
| 927,612 | Stevans | July 13, 1909 |
| 1,171,603 | Foutz | Feb. 15, 1916 |
| 1,840,912 | Morris | Jan. 12, 1932 |
| 2,158,541 | Horstmann | May 16, 1939 |
| 2,295,458 | Edwards | Sept. 8, 1942 |
| 2,309,223 | Staring | Jan. 26, 1943 |
| 2,336,124 | Phoenix | Dec. 7, 1943 |
| 2,426,694 | King | Sept. 2, 1947 |
| 2,512,666 | Meske | June 27, 1950 |
| 2,573,573 | Jenkins | Oct. 30, 1951 |
| 2,577,906 | Miller et al. | Dec. 11, 1951 |

FOREIGN PATENTS

| Number | Country | Date |
|---|---|---|
| 273,866 | Great Britain | July 14, 1927 |